US 8,416,928 B2

(12) United States Patent
Ramamoorthy et al.

(10) Patent No.: US 8,416,928 B2
(45) Date of Patent: Apr. 9, 2013

(54) PHONE NUMBER EXTRACTION SYSTEM FOR VOICE MAIL MESSAGES

(75) Inventors: Venkatesan Ramamoorthy, Round Rock, TX (US); Keith R. Walker, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 983 days.

(21) Appl. No.: 12/126,509

(22) Filed: May 23, 2008

(65) Prior Publication Data
US 2008/0226041 A1   Sep. 18, 2008

Related U.S. Application Data

(63) Continuation of application No. 11/422,707, filed on Jun. 7, 2006, now abandoned.

(51) Int. Cl.
H04M 11/00 (2006.01)
H04M 1/64 (2006.01)

(52) U.S. Cl. .................... 379/88.16; 379/88.03

(58) Field of Classification Search ....... 379/88.1–88.27
See application file for complete search history.

(56) References Cited

U.S. PATENT DOCUMENTS

| 5,640,485 | A | 6/1997 | Ranta |
| 5,864,603 | A | 1/1999 | Haavisto et al. |
| 6,370,399 | B1 | 4/2002 | Phillips |
| 6,393,304 | B1 | 5/2002 | Meche |
| 6,526,292 | B1 | 2/2003 | Henry, Jr. |
| 6,947,770 | B2 | 9/2005 | Rydbeck |
| 7,251,313 | B1 | 7/2007 | Miller et al. |
| 2002/0198027 | A1 | 12/2002 | Rydbeck |
| 2004/0029595 | A1 | 2/2004 | Keseg |
| 2005/0129188 | A1* | 6/2005 | Lee et al. ............. 379/88.01 |
| 2005/0141693 | A1* | 6/2005 | Stuart et al. ........... 379/265.06 |
| 2005/0175159 | A1* | 8/2005 | Cooper et al. ......... 379/88.03 |
| 2006/0246891 | A1* | 11/2006 | Rao et al. ............. 455/426.1 |
| 2007/0041521 | A1* | 2/2007 | Korah et al. ........... 379/88.14 |
| 2007/0127439 | A1* | 6/2007 | Stein ................... 370/352 |

(Continued)

OTHER PUBLICATIONS

S. Bezuayehu, Non-Final Office Action: mail date Aug. 31, 2009; published by the USPTO in utility U.S. Appl. No. 11/422,699, pp. 9.

(Continued)

*Primary Examiner* — Fan Tsang
*Assistant Examiner* — Solomon Bezuayehu
(74) *Attorney, Agent, or Firm* — Patents on Demand P.A.; Brian K. Buchheit; Scott M. Garrett

(57) ABSTRACT

Methods, apparatuses, and media for extracting phone numbers from voice mail messages are disclosed. Embodiments may include a method for determining a phone number in a voice mail message that includes analyzing a message and determining phone number(s) associated with the message based on the analysis. Embodiments of the method may also include generating a macro based on the determined phone number(s) and performing a macro action for at least one generated macro. In some embodiments, analyzing the message and determining phone number(s) associated with the message may include detecting a trigger word and parsing words in the message after the detected trigger word. In other embodiments, analyzing the message and determining one or more phone numbers associated with the message may include analyzing a voice-to-number dictionary and determining phone number(s) based on the dictionary. The macro action may include dialing, storing, deleting, etc. a phone number.

19 Claims, 5 Drawing Sheets

U.S. PATENT DOCUMENTS

| | | |
|---|---|---|
| 2007/0286398 A1 | 12/2007 | Ramamoorthy |
| 2007/0286399 A1 | 12/2007 | Ramamoorthy |
| 2008/0037745 A1 | 2/2008 | Ramamoorthy |
| 2008/0219414 A1 | 9/2008 | Ramamoorthy |

OTHER PUBLICATIONS

S. Bezuayehu, Non-Final Office Action; mail date Sep. 25, 2009; published by the USPTO in utility U.S. Appl. No. 11/422,707, pp. 10.

* cited by examiner

PHONE NUMBER EXTRACTION SYSTEM FOR VOICE MAIL MESSAGES

CROSS-REFERENCES TO RELATED APPLICATIONS

Pursuant to 35 USC §120, this continuation application claims priority to and benefit of U.S. patent application Ser. No. 11/422,707, entitled "PHONE NUMBER EXTRACTION SYSTEM FOR VOICE MAIL MESSAGES", filed on Jun. 7, 2006, the disclosure of which is incorporated herein in its entirety for all purposes.

FIELD OF INVENTION

The present invention is in the field of communication devices such as telephones and, in particular, to voice mail systems for receiving messages for telephones.

BACKGROUND

Telephones typically represent one of the primary ways an individual can communicate with another person or an organization such as a business or governmental agency. Typically, a user must dial a telephone number to establish a connection with another telephone associated with that telephone number. Answering machines and voice mail systems provide a well-established way for a user to leave a message for another user if the calling user is unable to reach another user. A user may attempt to call another and, if the recipient is unable or unwilling to answer their phone, a voice mail system may provide the calling user with the opportunity to leave a voice mail message for the recipient. The recipient may, at a later time, review their voice mail messages and may return missed phone calls based on the recorded messages.

Often, a person leaving a voice mail message will leave their phone number in the message so that the recipient will know how to reach them to return their call. In these cases, the person may leave a verbal message that says something to the effect of "call me back at 512-555-1212", where 512-555-1212 is the phone number the person used to call. In many other cases, the person leaving the message will leave alternate and/or multiple phone numbers if a single phone number will not suffice. The caller may leave a message, for example, that says "call me back at 512-555-1212 before 5 pm, but I'm out next week, so call Steve at 512-555-1234 next week". Users have great flexibility in what kind of information they leave in a voice mail message, resulting in a myriad of possibilities for the content and form of voice mail messages.

The recipient who is listening to voice mail message will often want to record phone numbers left in a message, particularly if the caller is someone for which the recipient does not yet have contact information. When the recipient listens to the voice mail message, they often have to scramble to get a pen to write down the phone numbers or open up a text editor to make a note of the phone numbers left in the voice mail message so that they can return a call. These solutions can be unsatisfactory when the recipient does not have a pen handy, has to re-listen to the message after missing some of the numbers, or is not ready to start manually recording the numbers. These solutions can also be unsatisfactory when the speaker is hard to understand, such as the caller talks fast, slurs, or is not speaking in their native language. These problems can be exacerbated if the recipient is otherwise distracted, such as if they are checking their voice mail messages from a mobile phone while they are driving. For a recipient who is checking messages while driving, having to manually write down phone numbers in a message can be very inconvenient and even dangerous. There is, therefore, a need for an effective and efficient solution for extracting phone numbers from voice mail messages.

SUMMARY OF THE INVENTION

The problems identified above are in large part addressed by methods, apparatuses, and media for extracting phone numbers from voice mail messages. Embodiments may include a method for determining a phone number in a voice mail message. The method may include analyzing a voice mail message and determining one or more phone numbers associated with the voice mail message based on the analysis of the voice mail message. Embodiments of the method may also include generating a macro based on the determined phone number(s) and performing a macro action for at least one generated macro. In some embodiments, analyzing the message and determining one or more phone numbers associated with the message may include detecting a trigger word and parsing words in the voice mail message after the detected trigger word. In other embodiments, analyzing the message and determining one or more phone numbers associated with the message may include analyzing a voice-to-number dictionary and determining phone numbers based on the dictionary. The macro action may include dialing, storing, deleting, etc. a phone number.

Another embodiment provides a machine-accessible medium containing instructions effective, when executing in a data processing system, to cause the system to perform a series of operations for determining a phone number in a voice mail message. The series of operations generally includes analyzing a voice mail message and determining one or more phone numbers associated with the voice mail message based on the analysis of the voice mail message. Embodiments may also include a series of operations for generating a macro based on the determined phone number(s) and performing a macro action for at least one generated macro.

A further embodiment provides a number extractor module to determine phone numbers in a voice mail message. The number extractor module may include a phone number determination module and a voice mail system interface, where the voice mail system interface receives a voice mail message from a voice mail system. The phone number determination module may include a voice mail parser to analyze the voice mail message to determine a phone number associated with the voice mail message. The phone number determination module may also include a macro generator to generate a macro based on the phone number determined by the voice mail parser. In some embodiments, the voice mail parser analyzes the voice mail message by analyzing a voice-to-number dictionary associated with the voice mail message. In other embodiments, the voice mail parser analyzes the voice mail message by detecting a trigger word in the voice mail and parsing words in the voice mail message after the detected trigger word.

BRIEF DESCRIPTION OF THE DRAWINGS

Aspects of the invention will become apparent upon reading the following detailed description and upon reference to the accompanying drawings in which, like references may indicate similar elements.

DETAILED DESCRIPTION OF EMBODIMENTS

Figure 1:
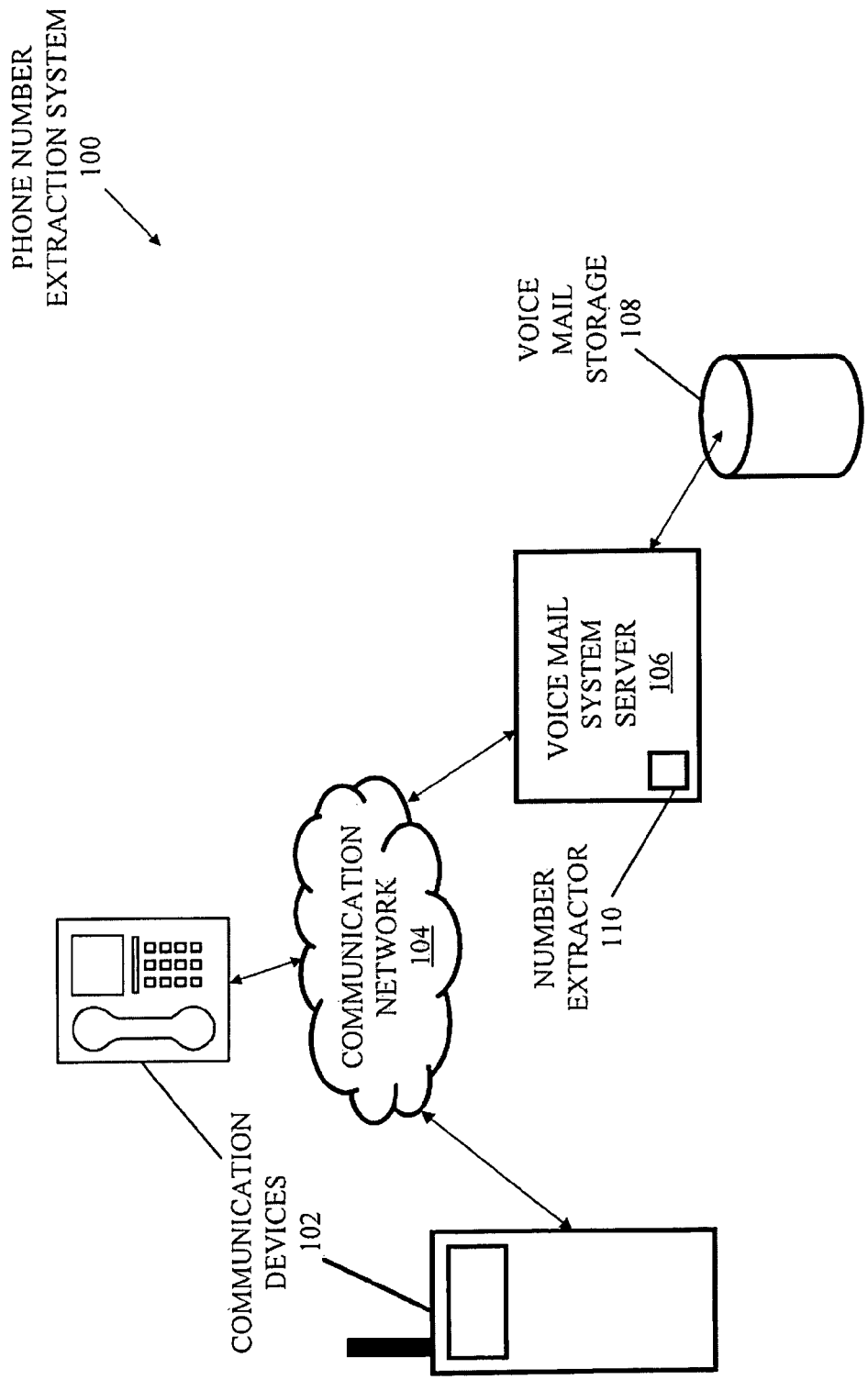
FIG. 1 depicts an environment for a phone number extraction system having a communication device and a voice mail system server with a number extractor according to one embodiment.

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, methods, apparatuses, and media for extracting phone numbers from voice mail messages are disclosed. Embodiments may include a method for determining a phone number in a voice mail message that includes analyzing a message and determining phone number(s) associated with the message based on the analysis. Embodiments of the method may also include generating a macro based on the determined phone number(s) and performing a macro action for at least one generated macro. In some embodiments, analyzing the message and determining phone number(s) associated with the message may include detecting a trigger word and parsing words in the message after the detected trigger word. In other embodiments, analyzing the message and determining one or more phone numbers associated with the message may include analyzing a voice-to-number dictionary and determining phone number(s) based on the dictionary. The macro action may include dialing, storing, deleting, etc. a phone number.

As will be described in more detail subsequently, the methodology of the disclosed embodiments may provide for an efficient and effective mechanism for determining phone numbers left in a voice mail message. By utilizing the disclosed methodology, a person receiving voice mail messages may extract any voice numbers embedded in the voice mail message. Embedded phone numbers may include numbers verbally left by the caller or, in some embodiments, phone numbers received via other means such as transmitting a voice-to-number dictionary. The disclosed methodology may also include the option of calling one of the extracted numbers or performing other action, providing additional convenience and functionality to the user. Accordingly, the person receiving voice mail messages may avoid having to manually write down, type, or memorize phone numbers left in a voice mail message, avoiding the wasted time, inconvenience, and, in some cases, increased risk from the distraction of manually recording phone numbers.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

While specific embodiments will be described below with reference to particular configurations of hardware and/or software, those of skill in the art will realize that embodiments of the present invention may advantageously be implemented with other substantially equivalent hardware and/or software systems. The invention can take the form of an entirely hardware embodiment, an entirely software embodiment or an embodiment containing both hardware and software elements. In a preferred embodiment, the invention is implemented in software, which includes but it not limited to firmware, resident software, microcode, etc.

Aspects of the invention described herein may be stored on computer-readable data storage medium as well as distributed electronically over the Internet or over other networks, including wireless networks. Data structures and transmission of data (including wireless transmission) particular to aspects of the invention are also encompassed within the scope of the invention. Furthermore, the invention can take the form of a computer program product accessible from a computer-readable data storage medium providing program code for use by or in connection with a computer or any instruction execution system. For the purposes of this description, a computer-usable or computer readable data storage medium can be any apparatus that can store the program for use by or in connection with the instruction execution system, apparatus, or device. The medium may be an electronic, magnetic, optical, or semiconductor system (or apparatus or device). Examples of a computer-readable data storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Each software program described herein may be operated on any type of data processing system, such as a personal computer, server, etc. A data processing system suitable for storing and/or executing program code may include at least one processor coupled directly or indirectly to memory elements through a system bus. The memory elements may include local memory employed during execution of the program code, bulk storage, and cache memories which provide temporary storage of at least some program code in order to reduce the number of times code must be retrieved from bulk storage during execution. Input/output (I/O) devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices though intervening private or public networks, including wireless networks. Modems, cable modems and Ethernet cards are just a few of the currently available types of network adapters.

Turning now to the drawings, FIG. 1 depicts an environment for a phone number extraction system having a communication device and a voice mail system server with a number extractor according to one embodiment. The disclosed phone number extraction system 100 includes one or more communication devices 102 in communication with a voice mail system server 106 via communication network 104. The voice mail system server 106 may include voice mail storage 108, which may be either external or internal to voice mail system server 106. As will be described in more detail, users of a voice mail system implemented on a voice mail system server 106 may request extraction of phone numbers from a recorded voice mail message via their communication device 102 and then receive an indication of phone numbers spoken in or otherwise associated with the voice mail message. A user may then request an action related to the extracted phone numbers, such as dialing a phone number, saving the phone number for later use, etc. The user may thus advantageously avoid having to manually record a phone number left in a voice mail message.

Communication devices 102 may include any devices adapted to communicate with a voice mail system. In some embodiments, a communication device 102 may be adapted to communicate via a phone connection (i.e., voice connection) of a communication network 104 with a voice mail system server 106. In other embodiments, a communication device 102 may communicate with a remote voice mail system server 106 via an Internet connection of other communication network 104 without using a phone connection, while in other embodiments a communication device 102 may include its own voice mail system, such as a personal computer implemented with Voice over Internet Protocol (VoIP) or other Internet telephony communication capabilities. Example communication devices 102 include mobile phones (such as cellular phones, satellite phones, or car phones) or traditional telephones (that connect to a telephone jack). Other example communication devices 102 may also include a personal computer with an Internet or other network connection that is adapted to allow voice communications, such as using a VoIP or other Internet telephony connection, or a voice communication-enabled personal digital assistant (PDA), automobile-based wireless device, wearable computer system, or other wireless communication device.

The communication network 104 may include any data communication channel (or combinations of channels) that allows voice communication between a communication device 102 and a voice mail system such as a voice mail system server 106. Example communication networks 104 include the Internet, an intranet, a local area network (LAN), a wide area network (WAN), an Ethernet network, wireless network, or telephone network (such as a cellular network). In one example where communication network 104 includes a cellular network, the communication device 102 may be in wireless communication with a base station as part of the communication network 104, which in turn may be in communication with a mobile switching center, gateway mobile switching center (GMSC), or other elements of a cellular network (and all part of the communication network 104). In some embodiments, a communication network 104 may include both a wireless network and a telephone network in communication via a GMSC. In yet other embodiments, communication network 104 may include a bus or other physical connection to facilitate communication between a communication device 102 and voice mail system implemented on the same device, such as a personal computer system. Those skilled in the art will recognize, however, that other types of data communication channels included in the communication network 104 without departure from the scope and spirit of the invention.

Voice mail system server 106 may be a server or other computer system that executes all or part of a voice mail system and is adapted to communicate with one or more communication devices 102. The voice mail system server 106 may provide voice mail services to a plurality of remote communication devices 102 via communication network 104. The voice mail system server 106 may be one or more of any type of computer system, including servers, personal computers, workstations, mainframe computers, desktop computers, or the like. In one embodiment, the voice mail system server 106 is an International Business Machines (IBM) IBM® eServer or similar server having one or more processors, or threads of processors, executing software and/or one or more state machines coupled with data storage devices such as random access memory (RAM), read only memory (ROM), flash memory, compact disk drives, hard drives, and the like. The voice mail system server 106 may include one or more software programs to implement a voice mail system, including the ability to receive voice mail messages, store voice mail messages in storage such as voice mail storage 108, and to playback voice mail messages to users via a communication device 102. Voice mail storage 108 may be any type of volatile or non-volatile storage to store recorded voice mail messages, such as a storage server or network attached storage (NAS), and may be implemented as part of the voice mail system server 106 or separately.

The voice mail system server 106 may also include a number extractor 110 in addition to a voice mail system. As will be described in more detail subsequently, the number extractor 110 may determine phone numbers for recorded voice mail messages to effectively extract those numbers from the recorded messages. In some embodiments, the number extractor 110 may analyze recorded voice mail messages by parsing the recorded messages to detect spoken phone numbers and generate macros to perform an action on the extracted phone numbers. If a caller spoke two alternative phone numbers while leaving a voice mail message, the number extractor 110 may parse the two phone numbers from the message and generate macros corresponding to each extracted phone number. The user may then choose to call one of the phone numbers, store them for later use, delete the numbers, or perform other actions. In other embodiments, the number extractor 110 may access a voice-to-number dictionary associated with a recorded voice mail message to determine the phone numbers associated with the voice mail message so that it may generate the appropriate macros. The number extractor 110 may receive the voice-to-number dictionary before, during, or after the recording of its associated voice mail message. The number extractor 110 may use either or both of the message parsing or voice-to-number dictionary embodiments to determine phone numbers for a particular voice mail message. The number extractor 110 may thus provide phone numbers associated with a voice mail message to users of a communication device 102.

Figure 2:
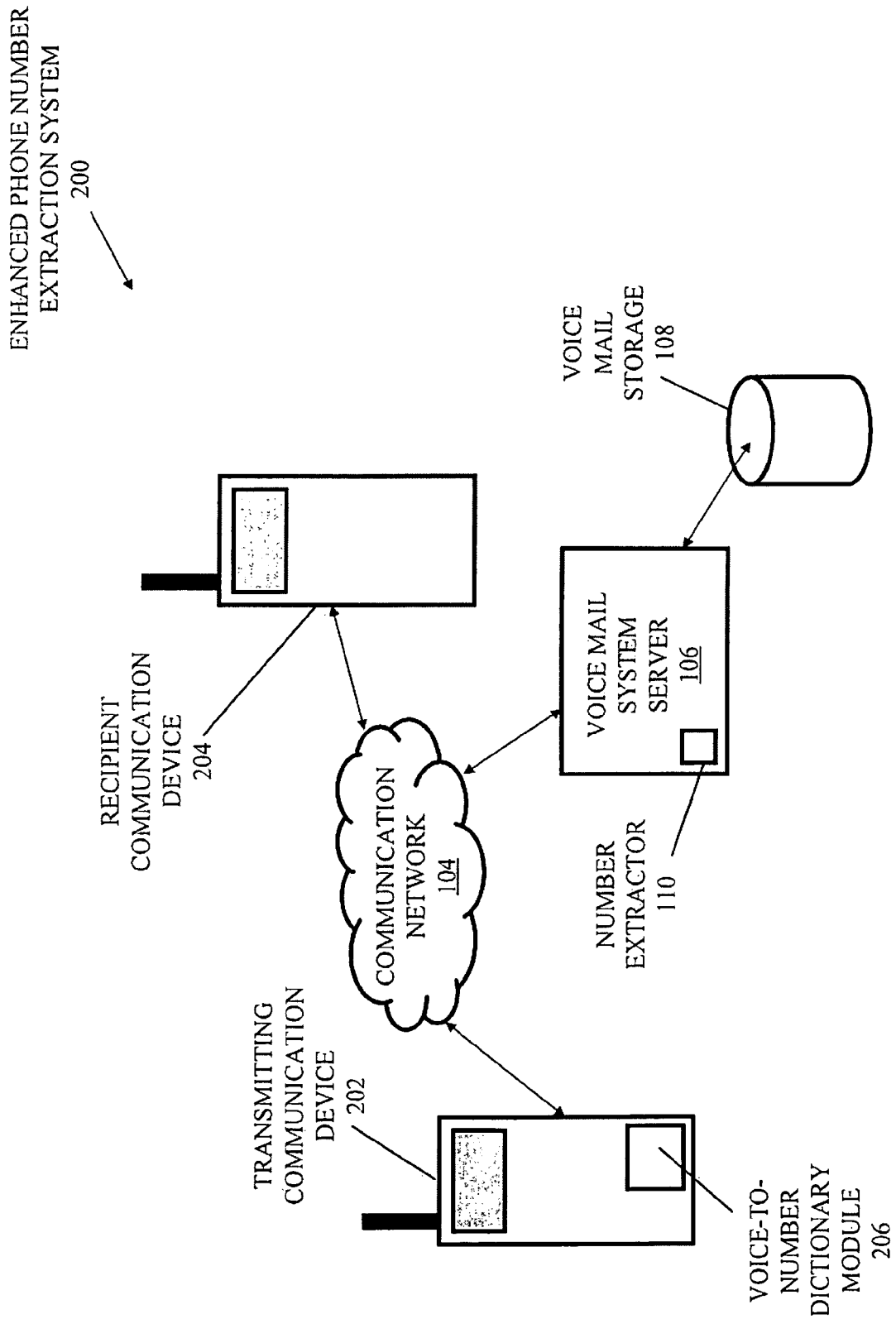
FIG. 2 depicts an environment for an enhanced phone number extraction system having voice-to-number dictionary capability according to one embodiment.

FIG. 2 depicts an environment for an enhanced phone number extraction system having voice-to-number dictionary capability according to one embodiment. The enhanced phone number extraction system 200 may include many of the same or similar components as the phone number extraction system 100 of FIG. 1 and the description of these components will not be repeated in the interest of brevity. The disclosed enhanced phone number extraction system 200 may include different and improved functionality when compared to the phone number extraction system 100 of FIG. 1.

The disclosed enhanced phone number extraction system 200 includes one or more transmitting communication devices 202, one or more recipient communication devices 204, and a voice mail system server 106 in communication with each other via communication network 104. The voice mail system server 106 may include voice mail storage 108, which may be either external or internal to voice mail system server 106.

As will be described in more detail, a user of a transmitting communication device 202 may attempt to call another user of a recipient communication device 204. If they are unable to establish a call (i.e., the user of the recipient communication device 204 does not answer) their call may be redirected to the voice mail system server 106 so that the user may leave a voice mail message. The transmitting communication device 202 of the enhanced phone number extraction system 200 may also transmit a voice-to-number dictionary to the voice mail system server 106 for storage. The voice-to-number dictionary may include an indication of phone numbers and associated words for the recipient to speak. When a user of a recipient communication device 204 reviews their voice mail message at a later time, they may speak one of the associated words and the associated phone number will be determined, providing the user with the opportunity of calling, storing, deleting, or performing other action with the phone number.

The transmitting communication device 202 may be a device similar to the communication device 102 of FIG. 1. The transmitting communication device 202 may include a voice-to-number dictionary module 206 to manage and transmit voice-to-number dictionaries. A voice-to-number dictionary may include an association between telephone numbers and spoken words. An example voice-to-number dictionary may include the words 'call Steve' associated with '1-512-555-9999', the words 'call me at home' associated with '1-512-555-8888', and so on. When the calling user leaves the voice message, they may explain to the recipient that, by speaking the appropriate words, different phone numbers may be reached. A typical voice mail message could indicate that the recipient could say 'call me at home' or 'call him at home' and the voice mail system would call the phone number associated with the words based on the voice-to-number dictionary.

The transmitting communication device 202 may transmit the voice-to-number dictionary to the number extractor 110 at any time. If the user of the transmitting communication device 202 leaves a voice mail message on a voice mail system, the voice-to-number dictionary module 206 may transmit the appropriate voice-to-number dictionary to the number extractor 110 before, during, or after the voice mail is left. The extent of the voice-to-number dictionary that is transmitted may vary based on user preference. A calling user may manually select one or more voice-to-number dictionary entries to transmit (e.g., by entry of keys on a keypad of the transmitting communication device 202), the entire dictionary to transmit, entries corresponding only to words spoken by the user during the voice mail message, or other methodologies. In some embodiments, the voice-to-number dictionary module 206 may transmit the voice-to-number dictionary entries to a number extractor 110 via any method of transmitting non-voice information, such as modem-style beeping, over a separate protocol such as TCP/IP, or other methodology.

The voice mail system server 106 of FIG. 2 may be substantially similar to the voice mail system server 106 of FIG. 1 but having a number extractor 110 compatible with the voice-to-number dictionary module 206 of the transmitting communication device. As described in more detail in relation to FIG. 3, the number extractor 110 of FIG. 2 may receive and store voice-to-number dictionaries (and an indication of the associated voice mail messages) received from any transmitting communication devices 202. In some embodiments, the voice-to-number dictionaries may be stored in the voice mail storage 108 along with their associated voice mail messages.

The recipient communication device 204 may be a device similar to the communication device 102 of FIG. 1. A user of a recipient communication device 204 may contact the voice mail system server 106 to review any stored voice mail messages. In some embodiments, the person leaving the message may state instructions in the voice mail message describing what the recipient user must say in order to call different numbers. In the example above, the user of the recipient communication device 204 may say 'call Steve' and the number extractor 110 of the voice mail system server 106 may dial the appropriate phone number. The user may have more than one choice, as described by the person leaving the message, giving the user reviewing the voice mail message flexibility in which phone number to call based on user preference, time of day, specific instructions, etc. In some embodiments, the recipient communication device 204 need not be customized in any way as the voice mail system server 106 and number extractor 110 process the voice-to-number dictionary, the recipient's spoken words, dialing the associated phone number, etc. In other embodiments, the recipient communication device 204 includes a voice mail system and number extractor 110, and accordingly may interact directly with a transmitting communication device 202.

Figure 3:
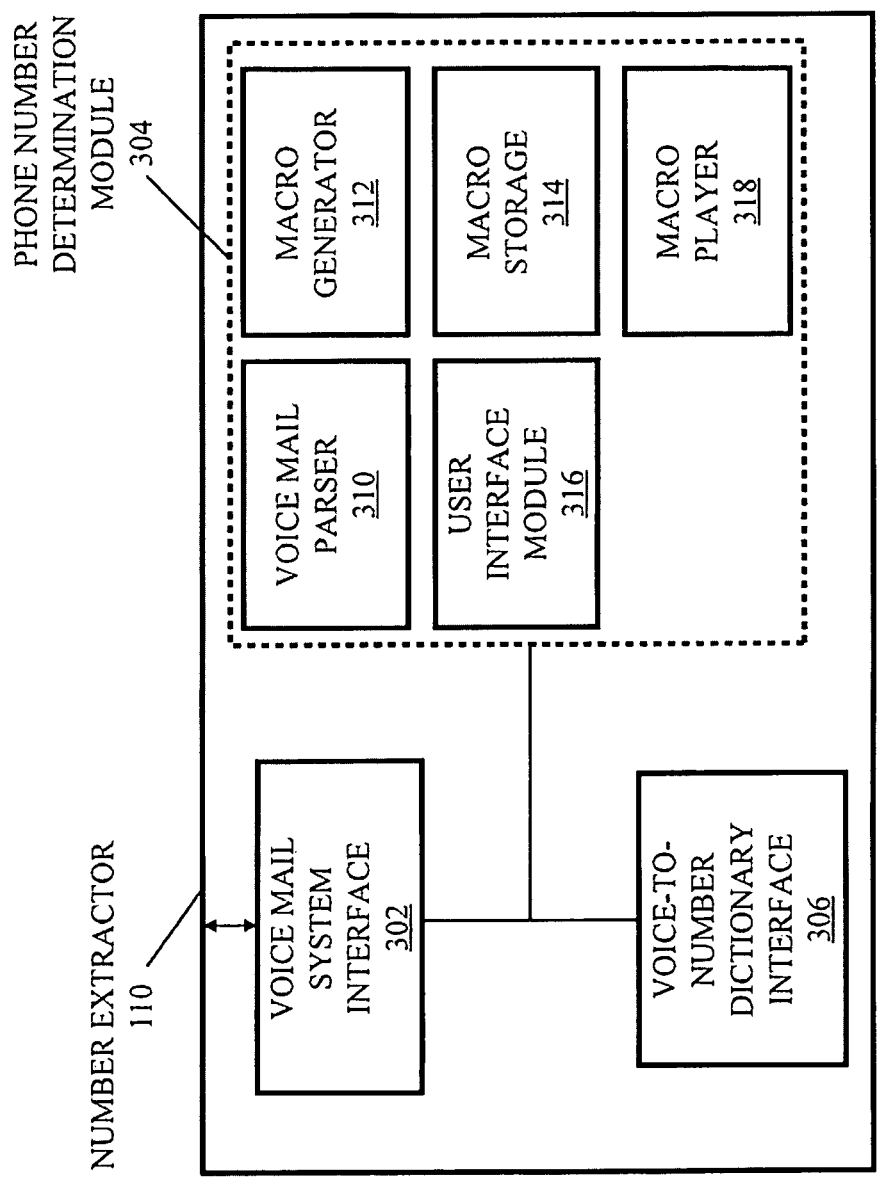
FIG. 3 depicts a conceptual illustration of software components of a number extractor according to one embodiment.

FIG. 3 depicts a conceptual illustration of software components of a number extractor according to one embodiment. One or more of the software components of the number extractor 110 may execute on a processor of a voice mail system server 106. Alternatively, one or more of the software components of the number extractor may execute on the recipient communication device 204 of FIG. 2. As described previously (and in more detail in relation to FIGS. 4 and 5), the number extractor 110 may determine one or more phone numbers associated with a recorded voice mail message and perform an action such as dialing on one of the determined phone numbers. The number extractor 110 may include a voice mail system interface 302, a phone number determination module 304, and an optional voice-to-number dictionary interface 306. The voice mail system interface 302 may facilitate communication and/or interaction between the number extractor 110 and a voice mail system implemented on a voice mail system server 106, recipient communication device 204, or other system.

The phone number determination module 304 may determine one or more phone numbers associated with a voice mail message. The phone number determination module 304 may include a voice mail parser 310, a macro generator 312, macro storage 314, a user interface module 316, and a macro player 318 according to the disclosed embodiment. The voice mail parser 310 may analyze a voice mail message to detect spoken phone numbers within the message. In some embodiments, the voice mail parser 310 may use voice recognition software to search for trigger words in the voice mail message. Trigger words may be any words or combination of words that provide an indication that a spoken phone number may soon follow. An example trigger word would be 'call me', such as if someone leaves a message saying 'call me at 512-555-7777'. In this example, the voice mail parser 310 may analyze the voice mail message until it finds the trigger word 'call me' and then continue to apply voice recognition analysis to detect the phone number spoken after 'call me'. Other potential trigger words could be 'phone', 'number', or any other words a provider of a number extractor 110 may deem to be indications of an upcoming phone number. Using trigger words may reduce the possibility of mistake (e.g., spoken numbers that are not phone numbers) and may also provide an association to a name or location when multiple phone numbers are contained within the message. In other embodiments, the voice mail parser 310 may simply apply voice recognition analysis to the entire message to extract any spoken phone numbers without using trigger words. The voice mail parser 310 may also recognize, analyze, and convert spoken phone numbers that utilize letters, such as 1-800-IBM-HELP or 1-800-GO-FEDEX. Recognition of spoken letters and words is known in the art and one of ordinary skill in the art will also recognize that the voice mail parser 310 may utilize algorithms presently known or later developed to parse letters, numbers, and words based on accents, different voices, dictionaries, etc.

In an alternative embodiment, the voice mail parser 310 may interact with the voice-to-number dictionary interface 306 to access information stored in the voice-to-number dictionary for the stored voice mail message so as to use that information in determining phone numbers associated with the message. The voice mail parser 310 may utilize either or both of voice recognition software to analyze the voice message or utilizing information contained in a voice-to-number dictionary interface. The voice mail parser 310 may, for example, detect one phone number within the spoken voice mail message as well as a second phone number from the voice-to-number dictionary to determine two total phone numbers associated with the voice mail message.

Once one or more phone numbers have been determined, or extracted, from a voice mail message, the macro generator 312 may generate one or more macros (also known as macro actions) based on the determined phone numbers and store the generated macros in macro storage 314. A macro for a particular phone number may dial the phone number, store the phone number for later use, delete the phone number from storage, or perform other action. The macro player 319 may perform a macro, such as upon request by a user. A user may request, for example, to dial a particular phone number associated with the recorded voice mail message after they have finished reviewing the message. The macro generator 312 may generate the macros based on the determined phone number by utilizing the determined phone number in full or modifying the determined phone number in some way. The macro generator 312 of the number extractor 110 may thus adjust the extracted numbers according to any dialing rules of the user or other methodologies, such as default settings. In one example, the macro generator 312 may truncate a determined phone number of '1-512-555-8888' if that number is a local number and the '1-512' portion need not be dialed. In another example, the macro generator 312 may add additional numbers to a determined phone number, such as by adding an area code, a leading '1', a number such as '9' to reach an outside line, a calling card code, etc.

The user interface module 316 of the phone number determination module 304 may provide for communications to and from a user. Communications to a user may include presenting a user with different macro options (either via voice or visual display), confirming a user's choice of macro or performance of a macro, etc. Communications from a user may include a request to perform a particular macro, which may be received via voice command, actuation of a button or user interface device, etc. In one example, the user interface module 316 may present the user via a voice dialogue with the option of dialing three different phone numbers the voice mail parser 310 determined were associated with the voice mail message. An example voice dialogue may be "Please say 'call home', 'call office', or 'call assistant' to contact the sender." The user interface module 316 in this example may then receive a spoken command and pass an indication of that command to the macro player 318 to dial the appropriate number. One of ordinary skill in the art will recognize that many different types and combinations of input and output are possible.

The user interface module 304 may process inputs from a user, including commands or requests, and may also provide output to the user (via controller interface 302). Output from the user interface module 304 may include requests for the user to repeat some or all of phone number, requests for approval to dial the number, providing an audible or visual indication of the spoken phone number, or any other information.

Figure 4:
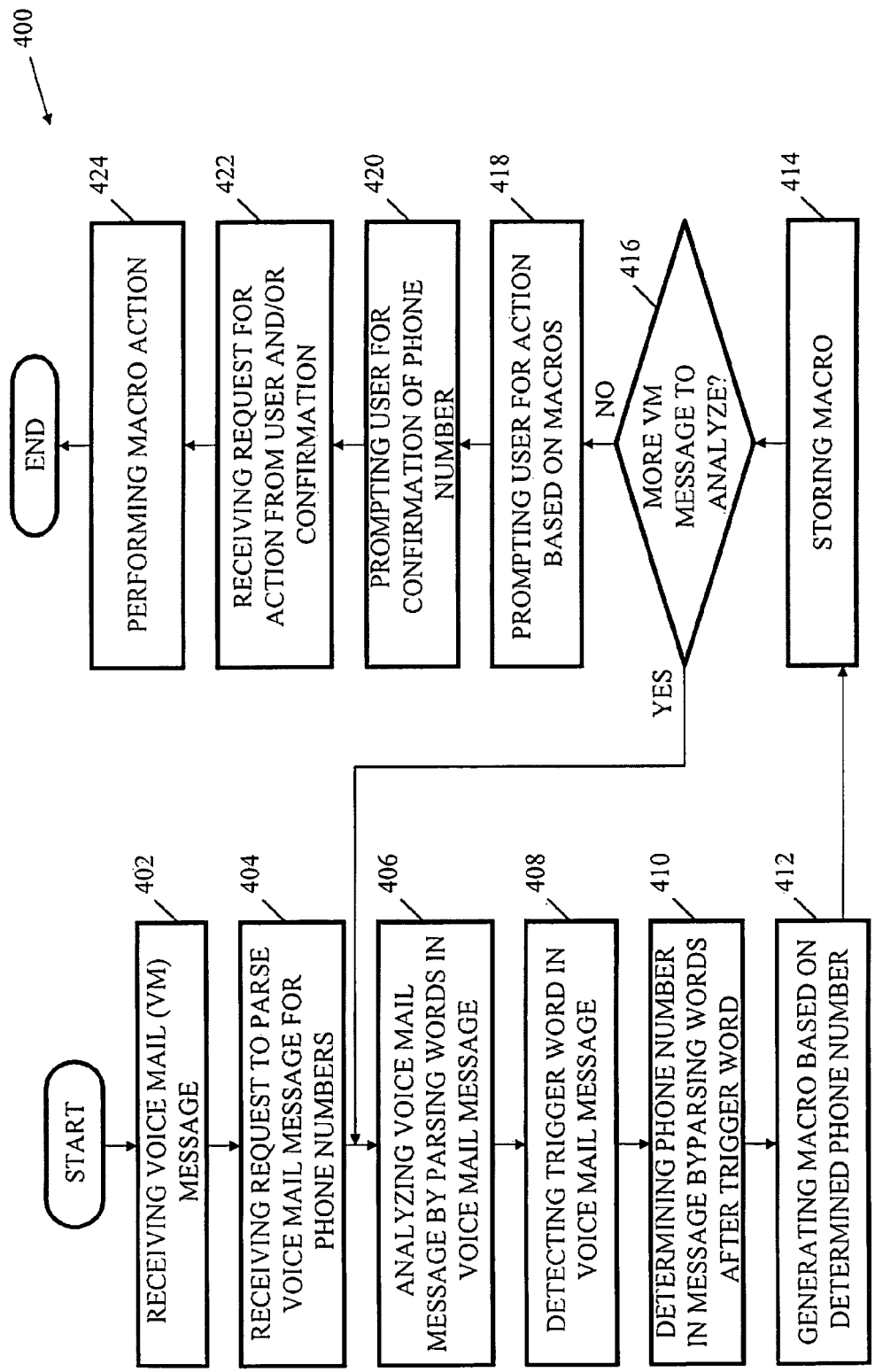
FIG. 4 depicts an example of a flow chart for determining a phone number in a voice mail message and performing a macro action based on the determined phone number according to one embodiment.

FIG. 4 depicts an example of a flow chart 400 for determining a phone number in a voice mail message and performing a macro action based on the determined phone number according to one embodiment. The method of flow chart 400 may be performed, in one embodiment, by a number extractor 110 (and its components) or other components of a voice mail system, such as a phone number determination module 304. Flow chart 400 begins with element 402, where the voice mail system (such as a voice mail system server 106) may receive a voice mail (VM) message from a caller. The voice mail system may record the voice mail message and store it in voice mail storage 108. The number extractor 110 may, at optional element 404, receive a request to parse a voice mail message for any associated phone numbers. In some embodiments, the number extractor 110 may receive such a request from a user or voice mail system, while in other embodiments the number extractor 110 may automatically parse voice mail messages and need not receive a specific request.

The phone number determination module 304 of the number extractor 110, and its component voice mail parser 310, may analyze the voice mail message by parsing the spoken words in the voice mail message at element 406. In some embodiments, the voice mail parser 310 may search for trigger words (as described previously) in the voice mail message, as depicted in element 408. The voice mail parser 310 may then determine a phone number within the voice mail message by parsing a series of words after the trigger word at element 410. Elements 408 and 410 may be repeated until the entire voice mail message has been analyzed. The voice mail parser 310 may parse the words after a trigger word in a variety of ways. In some embodiments, the voice mail parser 310 may utilize voice recognition techniques to parse the words to determine a phone number, which may be useful if the caller spells out a phone number. The voice mail parser 310 may also determine a name associated with the phone number based on its parsing. In other embodiments, the voice mail parser 310 may parse a name and cross-reference the name with a name dictionary to see if the system has a phone number associated with that name. As an example, the voice mail parser 310 may parse a voice mail message that says 'Please call me at 555-5555 or call Steve Johnson in Accounting' by detecting the trigger word 'call' and associating the phone number '555-5555' with the caller (because of 'call me') and may also detect the second trigger word of 'call' and parse the name 'Steve Johnson' by performing an information look-up in an internal corporate directory.

After determining one or more phone numbers, the macro generator 312 may generate one or more macros for each determined phone number at element 412 and may also optionally store the generated macros in macro storage 314 at element 414. The process of determining phone numbers and generating macros may continue at decision block 416 until the entire voice mail message is parsed. The voice mail parser 310 and macro generator 312 may thus step through a voice mail message to determine any phone numbers associated with the message and to generate a macro for each.

The user interface module 318 may prompt a user for action at element 418 based on the generated macros. For example, the user interface module 318 may prompt a user about whether they would like to call any of the determined phone numbers after the user has finished reviewing a recorded voice mail message. In the above example, the user interface module 318 may communicate to a user (either by audio or visual cues) to 'Press or say 1 to call the Sender and Press or say 2 to call Steve Johnson'. The user interface module 318 may also optionally prompt a user for confirmation of the determined phone numbers at element 420 so that the user may ascertain whether the numbers were determined correctly. At element 422, the user interface module 318 may receive a request for an action from a user and/or confirmation of the determined numbers (such as via button actuation, voice command, etc.). The macro player 318 may then perform any requested macro actions at element 424, after which the method terminates. In the above example, the macro player 318 may dial either of the determined numbers, save the numbers for later usage, etc.

Figure 5:
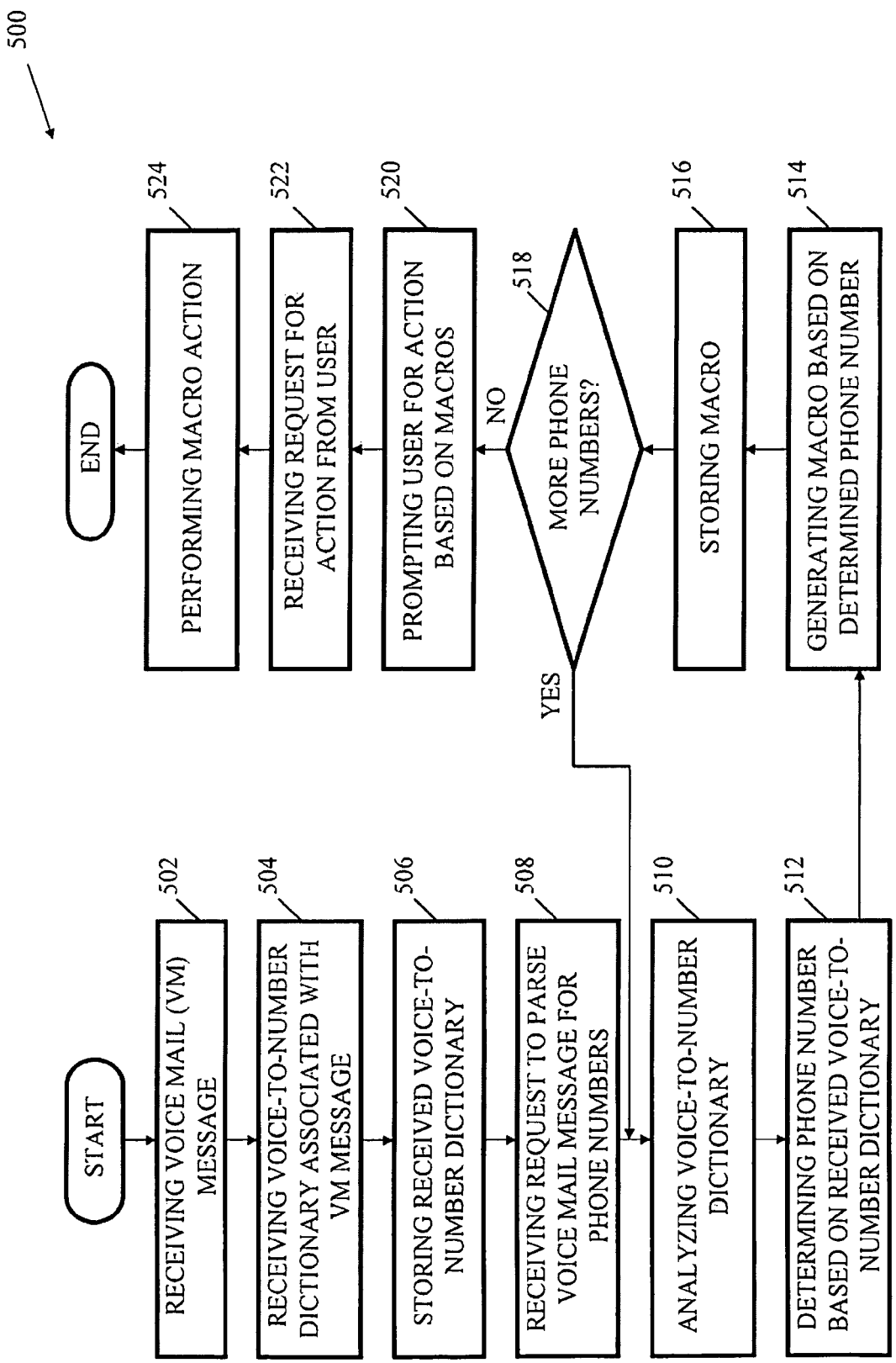
FIG. 5 depicts an example of a flow chart for determining a phone number in a voice mail message based on a voice-to-number dictionary and performing a macro action based on the determined phone number according to one embodiment.

FIG. 5 depicts an example of a flow chart 500 for determining a phone number in a voice mail message based on a voice-to-number dictionary and performing a macro action based on the determined phone number according to one embodiment. The method of flow chart 500 may be performed, in one embodiment, by a number extractor 110 (and its components) or other components of a voice mail system, such as a phone number determination module 304 and voice-to-number dictionary interface 306. Flow chart 500 begins with element 502, where the voice mail system (such as a voice mail system server 106) may receive a voice mail (VM) message from a caller. The voice mail system may record the voice mail message and store it in voice mail storage 108. The voice-to-number dictionary interface 306 may also receive a voice-to-number dictionary associated with the recorded voice mail message at element 504. The voice-to-number dictionary interface 306 may receive the dictionary before, during, or after the time the voice mail message is recorded. The voice-to-number dictionary interface 306 may receive the dictionary from the transmitting communication device 202 of FIG. 2, from an archive at a voice mail system server 106 or voice mail storage 108, or other location. The voice-to-number dictionary interface 306 may receive the voice-to-number dictionary in text form (for quicker transmission), in recorded voice form (for ease of translation), or other form or combination of forms. The voice-to-number dictionary interface 306 may store the received voice-to-number dictionary (such as in voice mail storage 108) at element 506.

The number extractor 110 may, at optional element 508, receive a request to parse a voice mail message for any associated phone numbers. In some embodiments, the number extractor 110 may receive such a request from a user of a receiving communication device 204 or voice mail system, while in other embodiments the number extractor 110 may automatically parse voice mail messages and need not receive a specific request.

The phone number determination module 304 of the number extractor 110, and its component voice mail parser 310, may analyze the voice mail message at element 510. The voice mail parser 310 may analyze the voice mail message in conjunction with the voice-to-number dictionary interface 306. At element 512, the voice-to-number dictionary interface 306 and voice mail parser 310 may determine the phone number(s) associated with a voice mail message by utilizing the received voice-to-number dictionary. In one example, the voice-to-number dictionary may include a phone number associated with Jim and a phone number associated with Steve. In this example, the caller who is leaving the message may tell the recipient to "Say 'call Jim' to call me and say 'call Steve' to call Steve" to provide the recipient with information as to what choices they will have. In other embodiments, the caller need not inform the recipient and the disclosed system may generate the necessary prompts.

After determining one or more phone numbers, the macro generator 312 may generate one or more macros for each determined phone number at element 514 and may also optionally store the generated macros in macro storage 314 at element 516. The process of determining phone numbers and generating macros may continue at decision block 518 until the entire voice mail message is parsed. The voice mail parser 310, voice-to-number dictionary interface 306, and macro generator 312 may thus step through a voice mail message and the voice-to-number dictionary to determine any phone numbers associated with the message and to generate a macro for each.

The user interface module 318 may prompt a user for action at element 520 based on the generated macros. For example, the user interface module 318 may prompt a user about whether they would like to call any of the determined phone numbers after the user has finished reviewing a recorded voice mail message. In the above example, the user interface module 318 may communicate to a user (either by audio or visual cues) to 'Say Jim to call the Sender and Say Steve to call Steve'. In some embodiments (such as if the caller leaves specific instructions), the user interface module 318 need not communicate the options to the user. At element 522, the user interface module 318 may receive a request for a action from a user (via spoken command in this example). The macro player 318 may then perform any requested macro actions at element 524, after which the method terminates. In the above example, the macro player 318 may dial either of the determined numbers (based on the user request), save the numbers for later usage, etc.

The methodology of flow chart 500 may provide additional precision when compared to the methodology of flow chart 400 as the voice-to-number dictionary eliminates the need to perform voice recognition on the caller's recorded voice mail message. Flow chart 500, however, may require an agreed upon protocol between the transmitting communication device 202 and the voice mail system server 106 so that the voice-to-number dictionary may be successfully transferred. The methodology of flow chart 500 may be particular useful for VoIP providers as the infrastructure for transferring voice-to-number dictionaries may be readily available (i.e., Internet connection already established). Some providers may utilize both the methodologies of flow charts 400 and 500 to provide additional flexibility and accuracy for users of the system.

It will be apparent to those skilled in the art having the benefit of this disclosure that the present invention contemplates methods, systems, and media for determining a phone number in a voice mail message. It is understood that the form of the invention shown and described in the detailed description and the drawings are to be taken merely as examples. It is intended that the following claims be interpreted broadly to embrace all the variations of the example embodiments disclosed.

What is claimed is:

1. A method for determining a phone number from a voice mail message, the method comprising the steps of:
   a computer receiving a voice mail message comprising a plurality of words, wherein said received voice mail message is from a caller who used a calling device;
   the computer receiving from the calling device a voice-to-number dictionary associated with the voice mail message, the voice-to-number dictionary comprising a plurality of phone numbers and one or more words associated with each of the plurality of phone numbers;
   the computer analyzing the voice mail message by parsing the plurality of words of the voice mail message and by comparing the parsed plurality of words to the one or more words associated with each of the plurality of phone numbers of the voice-to-number dictionary;
   the computer determining a phone number of the plurality of phone numbers of the voice-to-number directory that is associated with the voice mail message, wherein the step of determining the phone number comprises the computer determining that one or more words associated with the phone number matches one of the parsed plurality of words; and
   the computer performing a programmatic action that utilizes the determined phone number as input, wherein the programmatic action comprises one or more of dialing the determined phone number, storing an indication of determined phone number, or deleting a previously stored phone number and replacing the previously stored phone number with the determined phone number.

2. The method of claim 1, further comprising before the step of analyzing the voice mail message, the computer receiving a request to parse the voice mail message for phone numbers.

3. The method of claim 1, further comprising before the step of performing the programmatic action, the computer receiving a request to perform the programmatic action.

4. The method of claim 1, further comprising before the step of performing the programmatic action, the computer receiving by the computer system a confirmation of the determined phone number.

5. The method of claim 1, wherein the step of parsing the plurality of words of the voice mail message comprises the step of detecting by the computer system a trigger word in the voice mail message.

6. The method of claim 5, wherein the step of determining the phone number comprises the step of the computer parsing words in the voice mail message after the detected trigger word.

7. The method of claim 1, further comprising the steps of:
   the computer generating a macro based on the determined phone number; and
   the computer performing a macro action for the generated macro, wherein the programmatic action is the macro action.

8. The method of claim 1, wherein the programmatic action is dialing the determined phone number.

9. A computer program product for determining a phone number from a voice mail message the computer program product comprising:
   one or more computer-readable tangible storage devices;
   program instructions, stored on at least one of the one or more storage devices, to receive a voice mail message comprising a plurality of words, wherein said received voice mail message is from a caller who used a calling device;
   program instructions, stored on at least one of the one or more storage devices, to receive from the calling device a voice-to-number dictionary associated with the voice mail message, the voice-to-number dictionary comprising a plurality of phone numbers and one or more words associated with each of the plurality of phone numbers;
   program instructions, stored on at least one of the one or more storage devices, to analyze the voice mail message by parsing the plurality of words of the voice mail message and by comparing the parsed plurality of words to the one or more words associated with each of the plurality of phone numbers of the voice-to-number dictionary;
   program instructions, stored on at least one of the one or more storage devices, to determine a phone number of the plurality of phone numbers of the voice-to-number directory that is associated with the voice mail message, wherein the program instructions to determine the phone number determine that one or more words associated with the phone number matches one of the parsed plurality of words;
   program instructions, stored on at least one of the one or more storage devices, to perform a programmatic action that utilizes the determined phone number as input, wherein the-programmatic action comprises one or more of dialing the determined phone number, storing an indication of determined phone number, or deleting a previously stored phone number and replacing the previously stored phone number with the determined phone number.

10. The computer program product of claim 9, wherein program instructions to analyze the voice mail message by parsing the plurality of words in the voice mail message detect a trigger word in the voice mail message, and wherein program instructions to determine the phone number parse words in the voice mail message after the detected trigger word.

11. A computer system for determining a phone number from a voice mail message, the computer system comprising:
   one or more processors, one or more computer-readable memories, and one or more computer-readable tangible storage devices;
   program instructions, stored on at least one of the one or more storage devices for execution by at least one of the one or more processors via at least one of the one or more memories, to receive a voice mail message comprising a plurality of words, wherein said received voice mail message is from a caller who used a calling device; and
   program instructions, stored on at least one of the one or more storage devices for execution by at least one of the one or more processors via at least one of the one or more memories, to receive from the calling device a voice-to-number dictionary associated with the voice mail message, the voice-to-number dictionary comprising a plurality of phone numbers and one or more words associated with each of the plurality of phone numbers;
   program instructions, stored on at least one of the one or more storage devices for execution by at least one of the one or more processors via at least one of the one or more memories, to analyze the voice mail message by parsing the plurality of words of the voice mail message and by comparing the parsed plurality of words to the one or more words associated with each of the plurality of phone numbers of the voice-to-number dictionary;
   program instructions, stored on at least one of the one or more storage devices for execution by at least one of the one or more processors via at least one of the one or more memories, to determine a phone number of the plurality of phone numbers of the voice-to-number directory that is associated with the voice mail message, wherein the program instructions to determine the phone number determine that one or more words associated with the phone number matches one of the parsed plurality of words program instructions, stored on at least one of the one or more storage devices for execution by at least one of the one or more processors via at least one of the one or more memories, to perform a programmatic action that utilizes the determined phone number as input, wherein the programmatic action comprises one or more of dialing the determined phone number, storing an indication of determined phone number, or deleting a previously stored phone number and replacing the previously stored phone number with the determined phone number.

12. The computer system of claim 11, wherein the program instructions to analyze the voice mail message by parsing the plurality of words of the voice mail message by detecting a trigger word in the voice mail message and parsing words in the voice mail message after the detected trigger word.

13. The computer system of claim 11, wherein the program instructions to perform the programmatic action to perform a user selected macro action as the programmatic action.

14. The computer system of claim 11, further comprising:
program instructions, stored on at least one of the one or more storage devices for execution by at least one of the one or more processors via at least one of the one or more memories, to receive requests via a user interface from a user to perform a generated macro action as the programmatic action.

15. The method of claim 7, wherein the generated macros each comprise an indication of a phone number.

16. The method of claim 1, wherein the one or more words of the voice-to-number dictionary are digitally recorded words that were spoken by the caller.

17. The method of claim 1, wherein the determined phone number is a number from the voice-to-number dictionary that was not spoken in the voice mail message.

18. The method of claim 1, wherein the programmatic action comprises storing the indication of determined phone number in a contact list of a callee for whom the voice mail message was left.

19. The method of claim 1, wherein the programmatic action comprises deleting a previously stored phone number in a contact list of a callee for whom the voice mail message was left and replacing the previously stored phone number with the determined phone number, wherein the previously stored phone number and the replaced phone number correspond to an entry in the contact list for the caller.

* * * * *